July 15, 1924.

H. ROBINSON 1,501,372

MAGNETIC CIRCUIT OF ELECTRICAL MOTORS AND DYNAMOS

Filed Aug. 17, 1921

Inventor:
Henry Robinson
per, J. Severn
Attorney.

Patented July 15, 1924.

1,501,372

UNITED STATES PATENT OFFICE.

HENRY ROBINSON, OF HOBOKEN, NEAR ANTWERP, BELGIUM.

MAGNETIC CIRCUIT OF ELECTRICAL MOTORS AND DYNAMOS.

Application filed August 17, 1921. Serial No. 493,080.

*To all whom it may concern:*

Be it known that I, HENRY ROBINSON, a subject of the King of Great Britain, residing at Hoboken, near Antwerp, Belgium, 8 Rue Lambrechts, have invented certain Improvements in the Magnetic Circuit of Electrical Motors and Dynamos (for which I have filed applications in Belgium Jan. 22nd, 1920, Patent No. 284,736; in Germany March 22nd, 1920, not yet granted; in England October 25th, 1920, Patent No. 173,642; and in France Jan. 22nd, 1921, Patent No. 530,100), of which the following is a specification.

This invention relates to the magnetic circuit of electrical motors and dynamos. It is well known, that up to now some of these machines have been made with field magnets cast in one piece, that is to say the frame and pole pieces are cast together. In this case it is necessary to do without the usual polar extensions or pole tips to allow the field coils to be passed over the pole pieces. The majority of machines however are made with separate pole pieces, provided with polar extensions, attached to the inside of the frame. In consequence there is at each point of attachment an interruption in the magnetic circuit, and this will always cause a loss of efficiency, however carefully the attachment has been made.

The present invention has for its object more particularly to provide a construction of the field magnets which will make it possible to avoid interruption in the magnetic circuit at any point except at the space between the poles and the armature.

The invention is clearly illustrated in the accompanying drawings.

Figure 1:
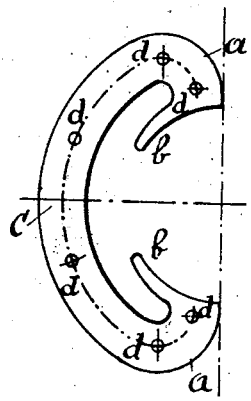
Figure 1 is a front elevation of a part of the field magnets of a bi-polar dynamo or motor.
Figure 2:
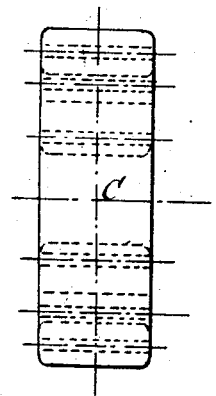
Figure 2 is a side elevation of one of the field magnets proper made up by assembling a quantity of sheet-iron parts such as shown in Figure 1.
Figure 3:
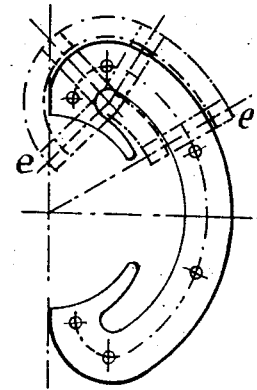
Figure 3 shows diagrammatically the method employed to place the field coils on the magnets.

With reference to the drawings, Fig. 1 represents a sheet metal part $a$ suitably shaped, Figure 2 represents several of these parts conveniently assembled by any suitable means, such as bolts and nuts $d$. This assemblage $c$ forms one of the two field magnets proper, comprising the yoke portion C with integral pole-halves $a$ at the ends.

Figure 4:
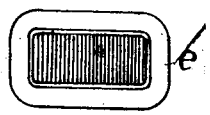
Figure 4 represents a sectional view showing a magnet coil in position.
Figure 5:
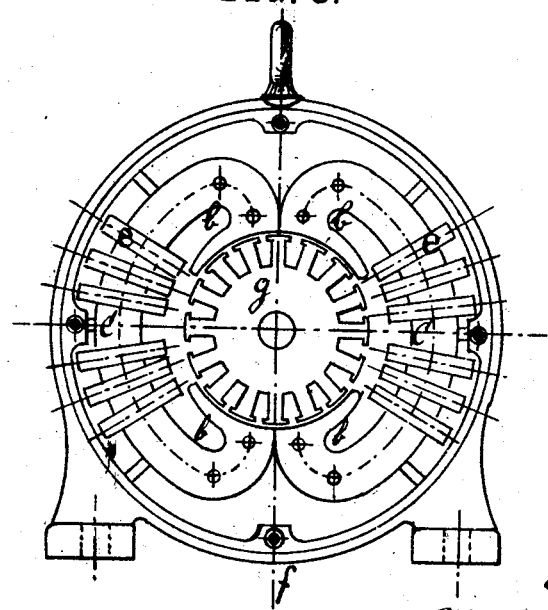
Figure 5 represents a vertical transversal section of a bi-polar dynamo or motor.

The magnet coils $e$ are made separately, and several of these coils are slipped one by one on the yoke portion C of the field magnet (Fig. 4), passing first over the pole extensions or tips $b$. Afterwards the different coils on one field magnet may be connected in series. The field magnets made up as explained are fitted in a circular frame as shown in Figure 5, with the pole halves of same polarity adjacent one another.

It is of course evident that the same construction can be employed in case of multipolar motors and dynamos.

The principal advantages of this method of construction are ($a$) the coils can be constructed and wound separately, ($b$) there is no discontinuation of the magnetic flow between the field magnets proper and the polar pieces, and consequently a better efficiency may be obtained.

I claim:

1. In dynamos and electric motors, field magnets each composed of a plurality of superposed sheet-iron stampings and having an arc-shaped yoke portion formed at the ends with integral pole-halves themselves provided with integral pole-tips in combination with a plurality of field-coils slipped over said pole tips onto said yoke-portion; and a circular housing having the field-magnets mounted therein; substantially as described.

2. In dynamos and electric motors, field magnets each composed of a plurality of superposed sheet-iron stampings and having an arc-shaped yoke-portion formed at the ends with integral pole-halves themselves extending into integral pole-tips embracing a substantial portion of the pole-arc, a plurality of field-coils slipped over said pole tips onto said yoke-portion; and a circular housing having the field-magnets mounted therein; substantially as described.

3. In dynamos and electric motors, the combination of field magnets each composed of a plurality of superposed C-shaped sheet-iron stampings having an arc-shaped yoke portion and integral pole-halves at the ends of said yoke-portion, a plurality of field-coils mounted onto said yoke-portion, and integral pole-tip extensions to said pole-halves, adapted to allow said coils being slipped over same and shaped to embrace a substantial portion of the pole-arc; and a circumferential housing adapted to have said field-magnets mounted therein, substantially as described.

In testimony thereof I signed hereunto my name in the presence of two subscribing witnesses.

HENRY ROBINSON.

Witnesses:
G. DEHERSY,
U. LEMAIRE.